O. A. SMITH.
Revolving Fire-Arms.

No. 135,378. Patented Jan. 28, 1873.

Witnesses.
J. H. Shumway
A. J. Tibbits

Otis A. Smith
Inventor
By Atty.
John S. Earle

UNITED STATES PATENT OFFICE.

OTIS A. SMITH, OF MIDDLEFIELD, CONNECTICUT.

IMPROVEMENT IN REVOLVING FIRE-ARMS.

Specification forming part of Letters Patent No. 135,378, dated January 28, 1873.

B.

*To all whom it may concern:*

Be it known that I, OTIS A. SMITH, of Middlefield, in the county of Middlesex and State of Connecticut, have invented a new Improvement in Revolving Fire-Arms; and do hereby declare the following, when taken in connection with the accompanying drawing and the letters of reference marked thereon, to be a full, clear, and exact description of the same, and which said drawing constitutes part of this specification, and represents in—

Figure 1:
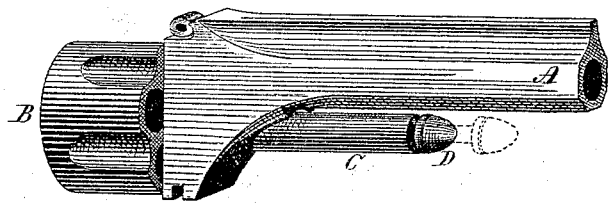
Figure 2:
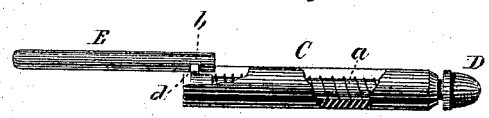
Figure 3:
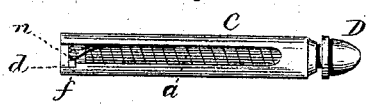

Figure 1, a side view of that portion of the pistol to which my improvement relates; and in Figs. 2 and 3, detached views.

This invention relates to an improvement in the manner of operating a center pin or axis, upon which the cylinder revolves; and it consists in the arrangement of a spindle within the arm, beneath the barrel, in connection with the axis or cylinder-spindle, the said spindle within the arm provided with a spring, the tendency of which is to force the spindle into the cylinder, and constructed so that when the spindle is in position for supporting the cylinder it will be automatically locked in that position.

A is the barrel; B, the cylinder, of common construction and relative arrangement; C, the arm, placed beneath the barrel in the usual manner, and by means of which the shells may be forced from the cylinder. This arm is made tubular, and centrally therethrough a spindle, $a$, is arranged, the said spindle having a head, D, upon the end of the arm, by means of which it may be drawn out, as denoted in broken lines, Fig. 1. Around this spindle within the arm a spiral spring is arranged, the tendency of which is to force and hold the spindle in the arm. E is the cylinder spindle or shaft, which extends through the cylinder and forms the axis, upon which the cylinder may turn. It is connected to the spindle $a$ by a stud, $d$, on the end of the said spindle $a$, engaging a corresponding notch, $b$, on the spindle E; and when so engaged the drawing out of the spindle $a$ draws the spindle E with it, and frees the cylinder. The return of the spindle $a$ also returns the spindle E into position to secure the cylinder. In order to secure the spindle in position I form a notch, $f$, in the rear end of the arm; (a slot is formed through the upper surface of the arm, to allow the passage of the projection $d$ and the spindle E with it;) and at that point I arrange a spring, $n$, on the arm, so that when the spindle $a$ has been returned into place the said spring $n$ will cause the projection $d$ to drop into the notch $f$ on the arm. Therefore, to withdraw the spindle it is necessary to turn it, which is done by means of the head D, until the projection $d$ can pass from the notch $f$; then withdraw the spindle, as before described.

I claim as my invention—

1. In combination with the barrel A, cylinder B, and arm C, the spindles $a$ and E, the said spindle $a$ arranged axially within the said arm C, and so as to engage the spindle E, substantially as and for the purpose described.

2. In combination with the subject-matter of the first clause of claim, the notch $f$ in the arm C, the projection $d$, and the spring $n$, substantially as and for the purpose described.

OTIS A. SMITH.

Witnesses:
 A. J. TIBBITS,
 HENRI TIBBITS.